United States Patent [19]

Shinozaki et al.

[11] Patent Number: 4,670,175
[45] Date of Patent: Jun. 2, 1987

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corporation, Tokyo, Japan

[21] Appl. No.: 921,537

[22] Filed: Oct. 21, 1986

[30] Foreign Application Priority Data

Oct. 25, 1985 [JP] Japan .................. 60-237628

[51] Int. Cl.[4] .............................................. H01G 9/02
[52] U.S. Cl. ..................... 252/62.2; 260/389; 534/558; 564/15
[58] Field of Search .......... 564/15; 534/558; 260/389; 252/62.2

[56] References Cited

U.S. PATENT DOCUMENTS

| | | | |
|---|---|---|---|
| 2,757,140 | 7/1956 | Bush | 252/62.2 |
| 3,118,939 | 1/1964 | Finkelstein et al. | 252/62.2 |
| 3,223,639 | 12/1965 | Powers et al. | 252/62.2 |
| 4,399,489 | 8/1983 | Ross | 252/62.2 |
| 4,447,346 | 5/1984 | MacNamee et al. | 252/62.2 |
| 4,541,037 | 9/1985 | Ross et al. | 252/62.2 |

Primary Examiner—Arthur P. Demers

[57] ABSTRACT

An electrolyte for electrolytic capacitor containing within an aprotic solvent a hexafluorophosphate of a tetraalkyl ammonium cation, a diazonium cation or a triarylcarbonyl cation.

5 Claims, No Drawings

ELECTROLYTE FOR ELECTROLYTIC CAPACITOR

An electrolyte for electrolytic capacitor containing within an aprotic solvent a hexafluorophosphate of an organic cation as solute.

An electrolyte for electrolytic capacitor according to the invention may conveniently be prepared, for example, by reacting tetraalkylammonium chloride, aryldiazonium chloride, or triarylmethyl chloride $[(Ar_3C)^+Cl^-]$ with ammonium hexafluorophosphate in the aprotic solvent to obtain each salt solution after removing the separated ammonium chloride.

FIELD OF THE INVENTION

This invention relates to an electrolyte for electrolytic capacitor containing within an aprotic solvent a hexafluorophosphate of an organic cation as solute.

BACKGROUND OF THE INVENTION

Hitherto, organic acids or its salts and glycol series pastes have been principally used as an electrolyte for electrolytic capacitor in the general purposes. The latest expansion of utilization for the electronic instruments requires more improvement and advancement in the reliability and performance of the capacitor entailing undesired problem of the presence of water in the paste and as a result an electrolyte using an aprotic solvent in place of organic acid and its salt and glycol paste has become to receive an attraction.

The greatest subject of employment of the aprotic solvent system electrolyte is how to obtain an electrolyte of high conductivity and to acheive this an organic carboxylic acid or its salt which is well soluble in the aprotic solvent and has a high degree of dissociation has been researched as a main work but not yet succeeded. To solve the matter and obtain a high conductivity a solvent which produces water resulted by the reaction between acids and alcohols or glycols and even water is incorporated into the aprotic solvent with still insufficient conductivity, increments of water and solute contents with poor reliability at the elevated temperature as disclosed in the Japanese patent publications No. 55-3989, 57-56763, 58-32769 and the U.S. Pat. No. 4,117,531.

After extensive researches and studies to obtain an electrolyte which is substantially nonaqueous system electrolyte and has a high conductivity with use of an aprotic solvent but without using any solvent which forms water in reaction between acids and alcohols with glycols, it has been discovered that an organic cation salt of hexafluorophosphate has a high solubility in the aprotic solvent with an enhanced releasability and provide a high conductivity.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by containing a hexafluorophosphate of organic cation in the aprotic solvent as solute.

PREFERRED EMBODYMENTS OF THE INVENTION

The organic cation according to the invention is preferably tetraalkylammonium cation of the general formula $[NR_4]^+$ in which R is hydrogen atom or alkyl groups having 1 to 5 carbon atoms.

Further, the organic cation according to the invention may preferably be diazonium cation of the general formula $[ArN_2]^+$ in which Ar is aryl group.

Moreover, the organic cation according to the invention may preferably be triarylcarbonyl cation of the general formula $[Ar_3C]^+$ in which Ar is aryl groups.

The aprotic solvent to be used in the invention may be selected from the followings but not limited thereto:

(1) Amide system solvent:

N-methylformamide, N-dimethylformamide, N-ethylformamide, N-diethylformamide, N-methylacetoamide, N-dimethylacetoamide, N-ethylacetoamide, N-diethylacetoamide, hexamethylphosphorinamide (2) Oxide compounds:

di-methylsulfoxide (3) Nitrile compounds:

acetonitrile (4) Cyclic esters, cyclic amides:

γ-butyrolactone, N-methyl-2-pyrrolidone, ethylenecarbonate, propylenecarbonate.

An electrolyte for electrolytic capacitor according to the invention may conveniently be prepared, for example, by reacting tetraalkylammonium chloride, aryldiazonium chloride, or triarylmethyl chloride $[(Ar_3C)^+Cl^-]$ with ammonium hexafluorophosphate in the aprotic solvent to obtain each salt solution after removing the separated ammonium chloride.

(EXAMPLES 1 TO 6)

An electrolyte for electrolytic capacitor according to the invention will be examplified in the followings with 10% by weight solution for hexafluorophosphate of various organic cations with respect to the conductivity as shown in Table 1.

TABLE 1

| Example | Organic cation hexafluorophosphate | Aprotic Solvent | Conductivity (ms/cm) |
|---|---|---|---|
| 1 | tetramethylammonium hexafluorophosphate $\begin{bmatrix} & CH_3 & \\ CH_3- & \overset{\mid}{\underset{\mid}{N}} & -CH_3 \\ & CH_3 & \end{bmatrix}^+ \cdot PF_6^-$ | N—dimethylformamide | 15.5 |
| 2 | tetrabutylammonium hexafluorophosphate $\begin{bmatrix} & C_4H_9 & \\ C_4H_9- & \overset{\mid}{\underset{\mid}{N}} & -C_4H_9 \\ & C_4H_9 & \end{bmatrix}^+ \cdot PF_6^-$ | dimethyl sulfoxide | 8.5 |
| 3 | triphenylcarbonium hexafluorophosphate | N—methyl pyrrolidone | 7.8 |

TABLE 1-continued

| Example | Organic cation hexafluorophosphate | Aprotic Solvent | Conductivity (ms/cm) |
|---|---|---|---|
| | 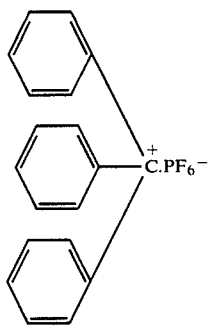 | | |
| 4. | tritolyl hexafluorophosphate | acetonitrile | 9.7 |
| | 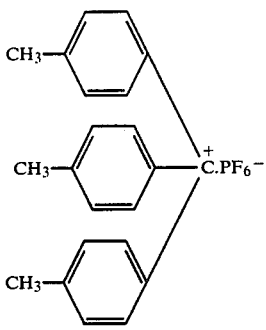 | | |
| 5 | P—chlorobenzene-diazonium hexafluorophosphate | γ-butyrolactone | 9.0 |
| | 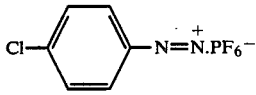 | | |
| 6 | P—methylbenzene-diazonium hexafluorophosphate | N—methyl-acetoamide | 8.5 |
| | 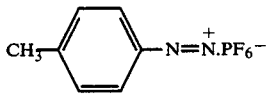 | | |
| Ref. | ethyleneglycol water | 78% by weight 12% by weight | 6.7 |

TABLE 1-continued

| Example | Organic cation hexafluorophosphate | Aprotic Solvent | Conductivity (ms/cm) |
|---|---|---|---|
| | ammonium adipate | 10% by weight | |

The life characteristics of electrolytes as examplified in Examples 1 to 6 and the comparative example are shown in Table 2.

TABLE 2

| | Initial Value | | | 110 deg. C 1000 hours | | |
|---|---|---|---|---|---|---|
| Example | Capacity μF | tan δ | Leakage Current μA | Capacity % | tan δ | Leakage Current μA |
| 1 | 1.04 | 0.014 | 0.35 | −6.2 | 0.043 | 0.04 |
| 2 | 1.02 | 0.036 | 0.35 | −3.1 | 0.039 | 0.03 |
| 3 | 1.03 | 0.045 | 0.33 | −2.3 | 0.058 | 0.05 |
| 4 | 1.02 | 0.028 | 0.37 | −7.0 | 0.052 | 0.06 |
| 5 | 1.02 | 0.032 | 0.38 | −5.8 | 0.044 | 0.05 |
| Ref. | 1.02 | 0.054 | 0.40 | −8.4 | 0.075 | 0.07 |

The electrolyte according to the invention may provide a non water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for electrolytic capacitor containing within an aprotic solvent a hexafluorophosphate of an organic cation as solute.

2. An electrolyte for electrolytic capacitor according to claim 1, wherein said organic cation is tetraalkylammonium cation of the general formula [NR₄]+ in which R is hydrogen atom or alkyl groups having 1 to carbon atoms.

3. An electrolyte for electrolytic capacitor according to claim 1, wherein said organic cation is diazonium cation of the general formula [ArN₂]+ in which Ar is aryl group.

4. An electrolyte for electrolytic capacitor according to claim 1, wherein said organic cation is triarylcarbonyl cation is triarylcarbonyl cartion of the general formula [Ar₃C]+ in which Ar is aryl group.

5. An electrolyte for electrolytic capacitor according to claim 1, wherein aprotic solvent is selected from N-methylformamide, N-dimethylformamide, N-ethylformamide, N-diethylformamide, N-methylacetamide, N-dimethylacetamide, N-ethylacetamide, N-diethylacetamide, γ-butyrolactone, N-methyl-2-pyrrolidone, ethylene carbonate, propylene carbonate, dimethyl sulfoxide, acetonitrile or a group of the mixture thereof.

* * * * *